US012729700B2

(12) United States Patent
Kondo et al.

(10) Patent No.: US 12,729,700 B2
(45) Date of Patent: Sep. 8, 2026

(54) HYDRAULIC SYSTEM

(71) Applicant: KAWASAKI JUKOGYO KABUSHIKI KAISHA, Kobe (JP)

(72) Inventors: Akihiro Kondo, Kobe (JP); Yoshifuru Okada, Kobe (JP); Hiroyasu Kodera, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/704,835

(22) PCT Filed: Aug. 9, 2022

(86) PCT No.: PCT/JP2022/030501

§ 371 (c)(1),
(2) Date: Jun. 13, 2025

(87) PCT Pub. No.: WO2023/084855

PCT Pub. Date: May 19, 2023

(65) Prior Publication Data

US 2025/0389285 A1 Dec. 25, 2025

(30) Foreign Application Priority Data

Nov. 9, 2021 (JP) ................................ 2021-182884

(51) Int. Cl.
*F15B 15/14* (2006.01)
*F04B 1/20* (2020.01)
*F04B 1/295* (2020.01)

(52) U.S. Cl.
CPC ............ *F15B 15/1404* (2013.01); *F04B 1/20* (2013.01); *F04B 1/295* (2013.01)

(58) Field of Classification Search
CPC ......... F15B 15/1404; F04B 1/20; F04B 1/295
See application file for complete search history.

(56) References Cited

U.S. PATENT DOCUMENTS

2010/0313849 A1* 12/2010 Stoner .................. B60W 10/02 417/1
2017/0037837 A1 2/2017 Funasaka et al.
2020/0240115 A1* 7/2020 Kondo .................... F16K 31/06

FOREIGN PATENT DOCUMENTS

CN 112780636 A * 5/2021 ........... F15B 19/005
JP 2015212522 A 11/2015
WO WO-2018088487 A1 * 5/2018 ............. F04B 53/16

* cited by examiner

*Primary Examiner* — Nathaniel E Wiehe
*Assistant Examiner* — Daniel S Collins
(74) *Attorney, Agent, or Firm* — Alleman Hall LLP

(57) ABSTRACT

A hydraulic system includes a hydraulic device and a determination device. The hydraulic device includes a casing, a cylinder block including first detected portions and one or more second detected portions on the outer peripheral surface of a cylinder block body, a piston, a linkage mechanism, and a sensor that is provided at a position corresponding to each of the detected portions. When the detected portion passes by during rotation of the cylinder block, the sensor outputs one of first and second signals. The determination device determines, based on an output from the sensor, whether the cylinder block is a suitable product. The first detected portions are circumferentially spaced apart at a predetermined first distance on the outer peripheral surface. The second detected portion(s) are circumferentially spaced apart from the adjacent first detected portion at a second distance different from the first distance on the outer peripheral surface.

8 Claims, 11 Drawing Sheets

HYDRAULIC SYSTEM

TECHNICAL FIELD

The present invention relates to a hydraulic system that includes a hydraulic device including a cylinder block in which a plurality of cylinder chambers are formed.

BACKGROUND ART

Axial pumps and axial motors such as those disclosed in Patent Literature (PTL) 1 are known as hydraulic devices. Both the axial pumps and the axial motors include a cylinder block. In the axial pumps and the axial motors, the cylinder block is replaced according to the frequency of use, the accumulated time, and the like.

CITATION LIST

Patent Literature

PTL 1: Japanese Laid-Open Patent Application Publication No. 2015-212522

SUMMARY OF INVENTION

Technical Problem

At the time of replacement of the cylinder block, it is necessary to use a cylinder block appropriate for the hydraulic device, in other words, a suitable product (for example, a genuine product). Meanwhile, as the cylinder block, there are unsuitable products manufactured so as to be compatible in terms of mounting. When an unsuitable product is used in the hydraulic device, problems such as a failure by the hydraulic device to achieve a desired function may occur. In view of this, there is a demand for the capability of determining whether a cylinder block to be used is a suitable product or an unsuitable product.

Thus, an object of the present invention is to provide a hydraulic system capable of determining whether or not the cylinder block is a suitable block.

Solution to Problem

A hydraulic system according to the first invention includes: a hydraulic device including a casing, a cylinder block including a plurality of first detected portions and one or more second detected portions on an outer peripheral surface of a cylinder block body rotatably supported on the casing and in which a plurality of cylinder chambers are formed around a rotating shaft, a piston that is housed in each of the plurality of cylinder chambers of the cylinder block in a manner that allows reciprocation of the piston, a linkage mechanism that reciprocates the piston in conjunction with rotation of the cylinder block, and a sensor that is provided at a position corresponding to each of the plurality of first detected portions and the one or more second detected portions and when each of the plurality of first detected portions and the one or more second detected portions passes by during the rotation of the cylinder block, outputs a corresponding one of a first signal and a second signal; and a determination device that determines, on the basis of an output result that is output from the sensor, whether or not the cylinder block is a suitable product. The plurality of first detected portions are circumferentially spaced apart from each other at a predetermined first distance on the outer peripheral surface of the cylinder block body. The one or more second detected portions are each circumferentially spaced apart from an adjacent one of the plurality of first detected portions at a second distance different from the first distance on the outer peripheral surface of the cylinder block body.

According to the first invention, during the rotation of the cylinder block, each of the first detected portion and the second detected portion is detected, and thus a first signal that is output at a time interval corresponding to the first distance and a second signal that is output at a time interval corresponding to the second distance appear. Using the first signal and the second signal that are output at different time intervals, the determination device can determine whether or not the cylinder block is a suitable product.

A hydraulic system according to the second invention includes: a hydraulic device including a casing, a cylinder block including a cylinder block body rotatably supported on the casing and in which a plurality of cylinder chambers are formed around a rotating shaft and N−1 first detected portions formed on an outer peripheral surface of the cylinder block body, a piston that is housed in each of the plurality of cylinder chambers of the cylinder block in a manner that allows reciprocation of the piston, a linkage mechanism that reciprocates the piston in conjunction with rotation of the cylinder block, and a sensor that is provided at a position corresponding to each of the plurality of first detected portions and when each of the plurality of first detected portions passes by during the rotation of the cylinder block, outputs a first signal; and a determination device that determines, on the basis of an output result that is output from the sensor, whether or not the cylinder block is a suitable product. The plurality of first detected portions are disposed at N−1 positions that are among positions determined by equally dividing the outer peripheral surface of the cylinder block body by N.

According to the second invention, the first detected portion is absent at the remaining position, and thus detecting the first detected portion during the rotation of the cylinder block results in the following. Specifically, the time interval at which the first signal is output according to two first detected portions located adjacent to each other across the remaining position in the direction of rotation is different from the time interval at which the first signal is output when the other first detected portions are detected. By varying the time interval at which the first signal is output in this manner, it is possible to allow the determination device to determine whether or not the cylinder block is a suitable product.

A hydraulic system according to the third invention includes: a hydraulic device including a casing, a cylinder block including a cylinder block body rotatably supported on the casing and in which a plurality of cylinder chambers are formed around a rotating shaft, N−2 first detected portions formed on an outer peripheral surface of the cylinder block body, and a second detected portion formed on the outer peripheral surface of the cylinder block body, a piston that is housed in each of the plurality of cylinder chambers of the cylinder block in a manner that allows reciprocation of the piston, a linkage mechanism that reciprocates the piston in conjunction with rotation of the cylinder block, and a sensor that is provided at a position corresponding to each of the N−2 first detected portions and the second detected portion and when each of the N−2 first detected portions and the second detected portion passes by during the rotation of the cylinder block, outputs a corresponding one of a first signal and a second signal; and a determination device that determines, on the basis of an output result that is output from the sensor, whether or not the cylinder block is a suitable product. The N−2 first detected portions are disposed at N−2 positions that are among positions determined by equally dividing the outer peripheral surface of the cylinder block body by N. The second detected portion is one second detected portion disposed at a position offset from two remaining positions among the positions determined by equally dividing the outer peripheral surface of the cylinder block body by N.

According to the third invention, the second detected portion is located at a position offset from the remaining positions, and thus when the first detected portion and the second detected portion are detected during the rotation of the cylinder block, the first signal and the second signal are output at different time intervals. Therefore, using the first signal and the second signal, it is possible to determine whether or not the cylinder block is a suitable product.

Advantageous Effects of Invention

According to the first to third inventions, it is possible to determine whether or not the cylinder block is a suitable product.

The above object, other objects, features, and advantages of the present invention will be made clear by the following detailed explanation of preferred embodiments with reference to the attached drawings.

DESCRIPTION OF EMBODIMENTS

Hereinafter, hydraulic systems 1, 1A to 1C according to Embodiments 1 to 4 of the present invention will be described with reference to the aforementioned drawings. Note that the concept of directions mentioned in the following description is used for the sake of explanation; the orientations, etc., of elements according to the invention are not limited to these directions. The hydraulic systems 1, 1A to 1C described below are merely one embodiment of the present invention. Thus, the present invention is not limited to the embodiments and may be subject to addition, deletion, and alteration within the scope of the essence of the invention.

Embodiment 1

Hydraulic System

Figure 1:
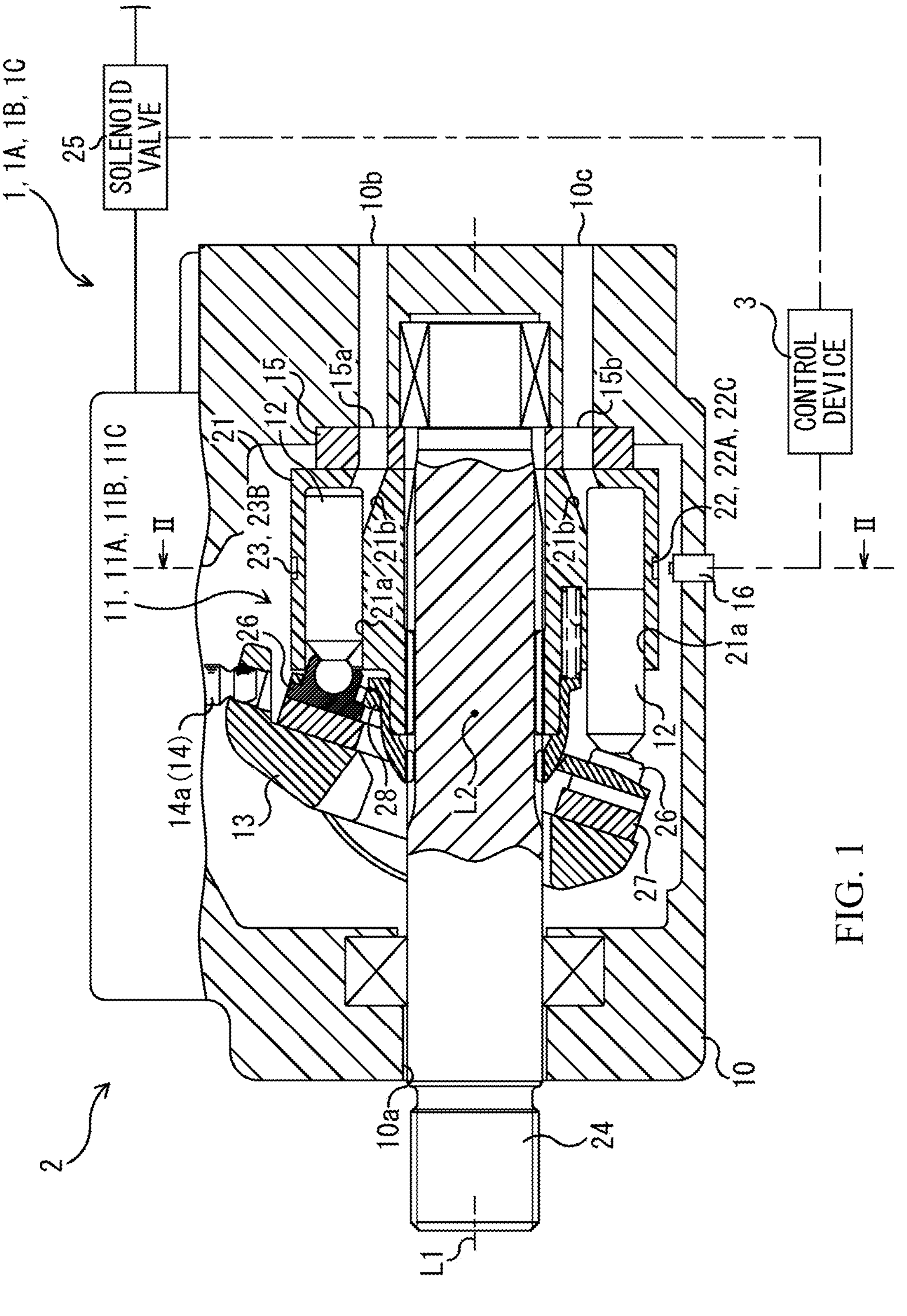
FIG. 1 is a cross-sectional view illustrating a hydraulic system according to Embodiments 1 to 4 of the present invention.

The hydraulic system 1 according to Embodiment 1 of the present invention illustrated in FIG. 1 is provided in various machines, for example, construction equipment such as an excavator and a crane, industrial equipment such as a forklift, farm equipment such as a tractor, and hydraulic equipment such as a press machine. The hydraulic system 1 operates by supplying a working fluid to an actuator included in various machines or receiving the working fluid from the actuator. The hydraulic system 1 includes a hydraulic device 2 and a control device 3.

Hydraulic Device

The hydraulic device 2 functions as at least one of a hydraulic pump and a hydraulic motor. In the present embodiment, the hydraulic device 2 is a hydraulic pump or a swash plate pump of the variable capacity type. The hydraulic device 2 includes a casing 10, a cylinder block 11, a plurality of pistons 12, a swash plate 13, a regulator 14, a valve plate 15, and a sensor 16. Note that the hydraulic device 2 may be a swash plate pump of the fixed capacity type or may be a bent axis pump. The hydraulic device 2 is capable of discharging a working fluid by being driven by a drive source (for example, one or both of an engine E and an electric motor; in the present embodiment, the engine E).

Casing

The casing 10 houses the cylinder block 11, etc., therein. At an end of the casing 10 that is located on one side in an axial direction in which a predetermined axis L1 extends, an opening 10*a* is formed. Furthermore, at an end of the casing 10 that is located on the other side in the axial direction, an inlet passage 10*b* and an outlet passage 10*c* are formed.

Cylinder Block

The cylinder block 11 includes a cylinder block body 21, a plurality of first detected portions 22, and a plurality of second detected portions 23. The cylinder block body 21 is housed in the casing 10. The cylinder block body 21 is formed in the approximate shape of a circular cylinder. A rotating shaft 24 is inserted through the cylinder block body 21 along an axis thereof in such a manner that relative rotation thereof is impossible. The rotating shaft 24 is supported on the casing 10 in such a manner as to be rotatable about the axis L1. Specifically, the cylinder block body 21 is rotatably supported on the casing 10 via the rotating shaft 24. The rotating shaft 24 has one end protruding from the opening 10*a*. The one end of the rotating shaft 24 is coupled to the engine E. When the engine E rotates the rotating shaft 24, the cylinder block 11 rotates about the axis L1.

Furthermore, in the cylinder block body 21, a plurality of cylinder chambers 21*a* are formed around the rotating shaft 24. More specifically, the plurality of cylinder chambers 21*a* are formed on an end surface of the cylinder block body 21 that is located on one side in the axial direction. The cylinder chamber 21*a* extends on the other side in the axial direction.

The cylinder chamber 21*a* is open on an end surface on the other side in the axial direction through a cylinder port 21*b*. Note that in the present embodiment, nine cylinder chambers 21*a* are formed in the cylinder block body 21. The number of cylinder chambers 21*a* is a mere example and may be less than or equal to eight or may be greater than or equal to 10.

Figure 2:
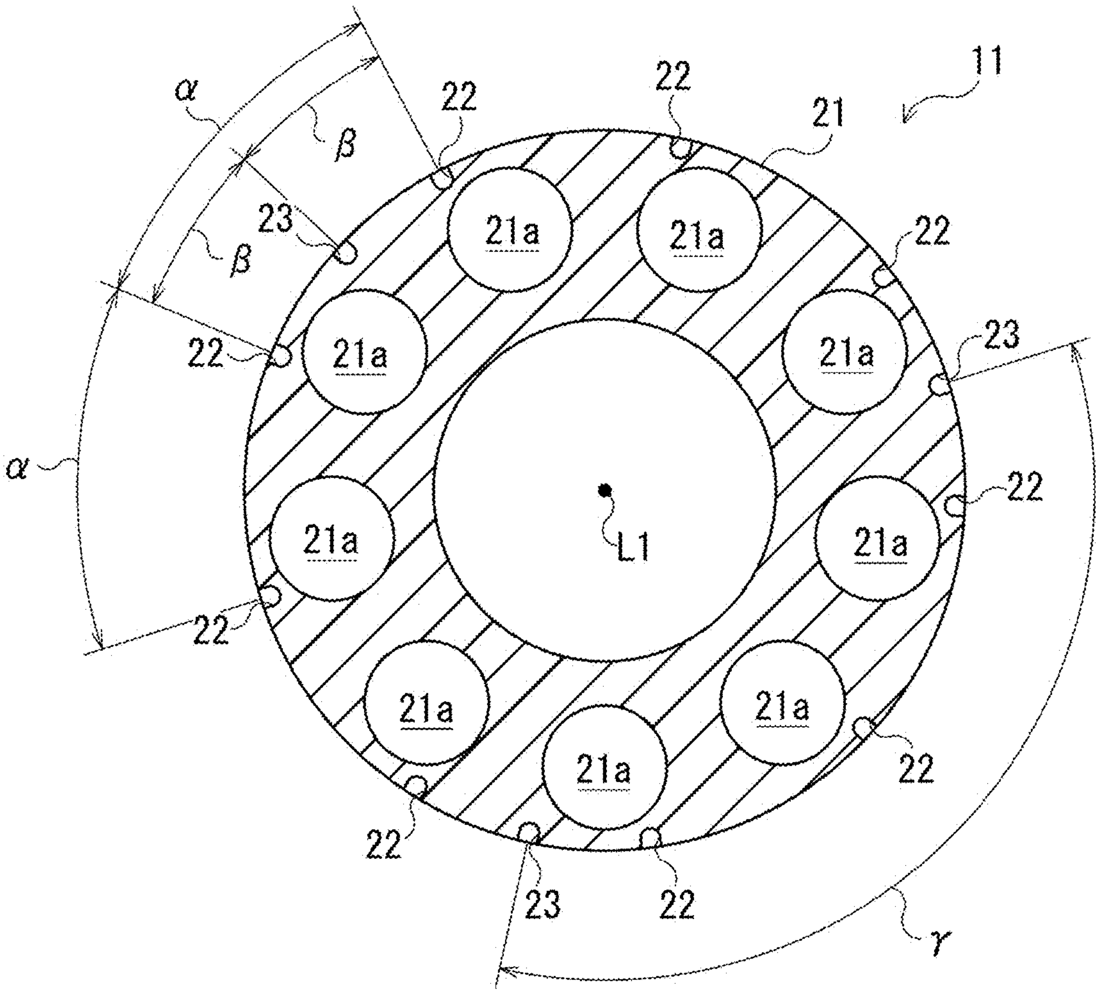
FIG. 2 is a cross-sectional view illustrating a cylinder block of a hydraulic device included in the hydraulic system illustrated in FIG. 1 taken along a cut line II-II.

The plurality of first detected portions 22 are formed on the outer peripheral surface of the cylinder block body 21, as illustrated in FIG. 2. The plurality of first detected portions 22 are circumferentially spaced apart at a first distance α (for example, an angle) on the outer peripheral surface of the cylinder block body 21. More specifically, the first detected portions 22 are formed at regular intervals on the outer peripheral surface of the cylinder block body 21. In the present embodiment, nine first detected portions 22, the number of which is equal to the number of cylinder chambers 21*a*, are formed. Specifically, the nine first detected portions 22 are formed at a distance of 40 degrees (=α) around the axis L1 on the outer peripheral surface of the cylinder block body 21. Note that the number of first detected portions 22 is not limited to said number and may be greater than or equal to said number or may be less than said number.

The first detected portion 22 is a recess. Note that the first detected portion 22 may be a protrusion as described later. More specifically, the first detected portion 22 is a recessed groove. In the present embodiment, the first detected portion 22, which is a groove with a radially inward depth, is formed so as to have a U-shaped cross section. Note that the cross-sectional shape of the first detected portion 22 is not limited to a U-shape and may be a V-shape, a square, a semicircle, or any other shape. The first detected portion 22 is formed in a portion of the outer peripheral surface of the cylinder block body 21 that is located at the middle in the axial direction, for example. Note that the position at which the first detected portion 22 is formed is not limited to said position. Specifically, the first detected portion 22 may be formed on either of the one side and the other side in the axial direction and may be formed to extend from one end to the other end of the cylinder block body 21 in the axial direction.

The plurality of second detected portions 23 are formed on the outer peripheral surface of the cylinder block body 21. Each of the plurality of second detected portions 23 is circumferentially spaced apart from an adjacent one of the first detected portions 22 at a second distance β. The second distance β is an angle different from the first distance α. More specifically, a smaller number of second detected portions 23 than the number of first detected portions 22 are formed on the outer peripheral surface of the cylinder block body 21. The second detected portion 23 is located between two adjacent ones of the first detected portions 22. The second detected portion 23 is spaced apart from at least one of these two first detected portions 22 at the second distance β. In the present embodiment, three second detected portions 23 are formed. The three second detected portions 23 are arranged at regular intervals (for example, offset from each other by γ=120 degrees around the axis L1). The second detected portion 23 is positioned at the second distance β from both of the two adjacent first detected portions 22. Note that the number of second detected portions 23 may be one or two or may be four or more. The plurality of second detected portions 23 do not necessarily need to be arranged at regular intervals. The second detected portion 23 may be positioned at the second distance β from only one of the two adjacent first detected portions 22.

Figure 3:
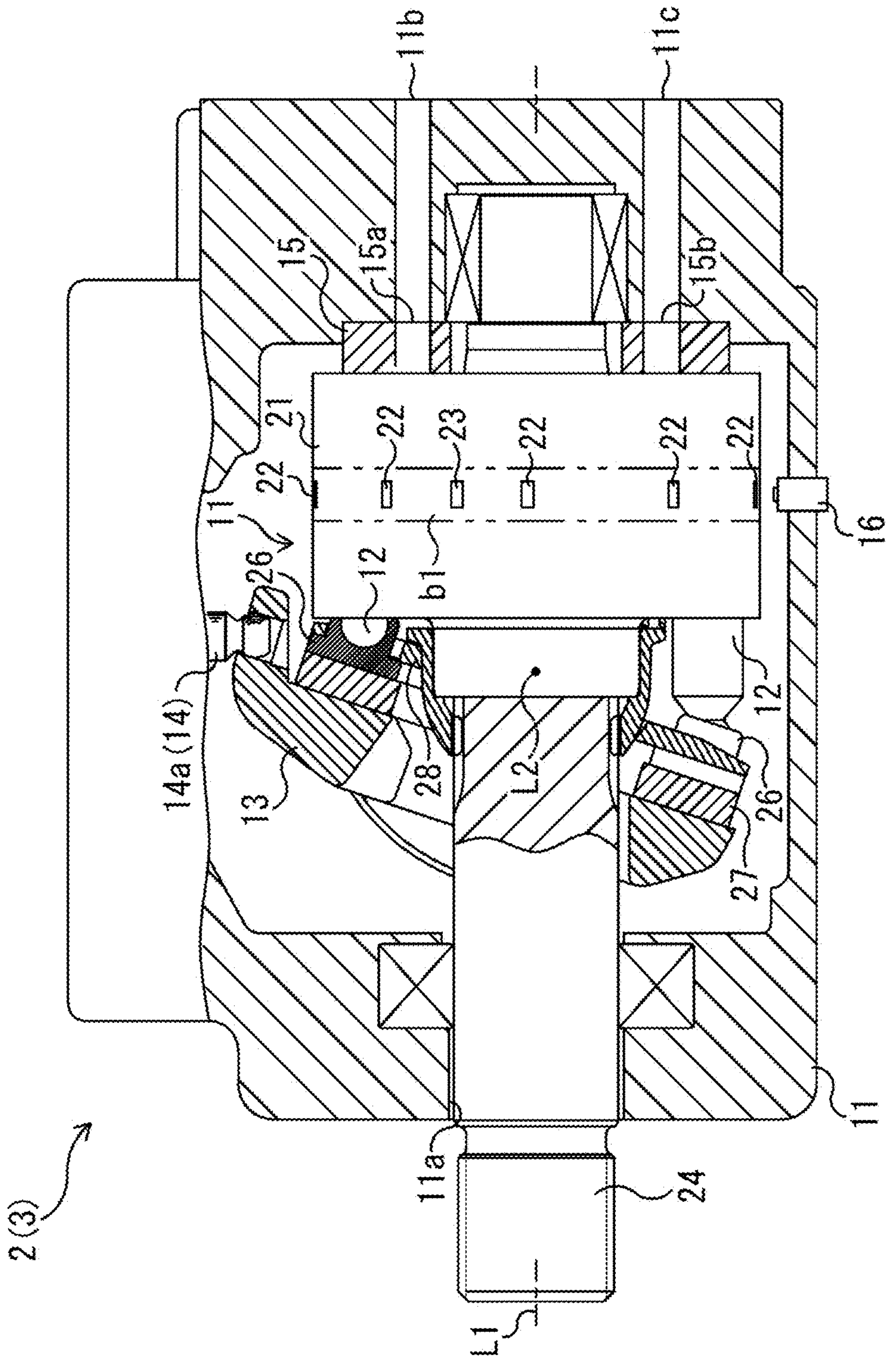
FIG. 3 is a front view illustrating the cylinder block of the hydraulic device included in the hydraulic system illustrated in FIG. 1.

As illustrated in FIG. 3, along with the first detected portions 22, the second detected portions 23 are arranged on a partial peripheral surface b1 extending circumferentially on the outer peripheral surface of the cylinder block body 21. This means that the second detected portion 23 is disposed so as to at least partially overlap the other second detected portions 23 and all the first detected portions 22 in the circumferential direction. In the present embodiment, the first detected portions 22 and the second detected portions 23 are disposed so as to overlap each other as a whole in the circumferential direction.

Similar to the first detected portion 22, the second detected portion 23 is a recessed groove. Specifically, in the present embodiment, the second detected portion 23, which is a groove with a radially inward depth, is formed so as to have a U-shaped cross section. Note that the cross-sectional shape of the second detected portion 23 is not limited to a U-shape and may be a V-shape, a square, a semicircle, or any other shape. The second detected portion 23 is formed in a portion of the outer peripheral surface of the cylinder block body 21 that is located at the middle in the axial direction, for example. Note that the position at which the second detected portion 23 is formed is not limited to said position. Specifically, the second detected portion 23 may be formed on either of the one side and the other side in the axial direction and may be formed to extend from one end to the other end of the cylinder block body 21 in the axial direction.

Piston

The plurality of pistons 12 are inserted into the respective cylinder chambers 21*a* of the cylinder block 11. Each of the pistons 12 reciprocates in a corresponding one of the cylinder chambers 21*a*. A shoe 26 is slidably and rotatably mounted on a leading end portion of the piston 12.

Swash Plate

A swash plate 13, which is one example of the linkage mechanism, is positioned apart from the cylinder block 11 on one side in the axial direction thereof and tilted toward the cylinder block 11. The swash plate 13 supports the shoe 26 from one side in the axial direction. More specifically, a shoe plate 27 is provided on the swash plate 13. The swash plate 13 supports the shoe 26 via the shoe plate 27. A pressing plate 28 is provided on the shoe plate 27. The pressing plate 28 presses the plurality of shoes 26 against the shoe plate 27. While being pressed by the pressing plate 28, the shoe 26 slidably rotates about the axis L1 on the shoe plate 27 which is tilted. Therefore, when the cylinder block 11 rotates, the piston 12 reciprocates in the cylinder chamber 21*a*. Furthermore, the swash plate 13 can change a tilt angle by rotating about an axis L2 orthogonal to the axis L1. This allows the piston 12 to change a stroke length thereof. Thus, the amount of the working fluid to be discharged from the hydraulic device 2 can be changed as described later.

Regulator

The regulator 14 can rotate the swash plate 13 around the axis L2 to change the tilt angle of the swash plate 13. More specifically, in the regulator 14, a servo piston not illustrated in the drawings is coupled to the swash plate 13 via a coupling member 14*a*. The regulator 14 moves the servo piston according to a signal that is input to the regulator 14. More specifically, the signal that is input to the regulator 14 is a pilot pressure. A solenoid valve 25 adjusts the pilot pressure. Thus, the regulator 14 adjusts the tilt angle of the swash plate 13 according to the adjusted pilot pressure.

Valve Plate

The valve plate 15 is located between the cylinder block 11 and an end surface of the casing 10 that is located on the other side in the axial direction. In the valve plate 15, an inlet port 15*a* and an outlet port 15*b* leading to the inlet passage 10*b* and the outlet passage 10*c*, respectively, are formed. When the cylinder block 11 rotates, the cylinder port 21*b* to which each of the inlet port 15*a* and the outlet port 15*b* is connected changes. The inlet port 15*a* allows the working fluid to flow from the inlet passage 10*b* to the cylinder chamber 21*a* through the cylinder port 21*b* to which the inlet port 15*a* is connected. The outlet port 15*b* allows the working fluid to be discharged from the cylinder chamber 21*a* to the outlet passage 10*c* through the cylinder port 20*b* to which the outlet port 15*b* is connected.

Sensor

The sensor 16 is provided at a position corresponding to the first detected portion 22 and the second detected portion 23. During the rotation of the cylinder block 11, when the first detected portion 22 and the second detected portion 23 pass by the sensor 16, the sensor 16 outputs a first signal S1 and a second signal S2, respectively (refer to FIG. 4). More specifically, the sensor 16 is provided on the casing 10, at a position corresponding to the partial peripheral surface b1 of the cylinder block 11 (in the present embodiment, a position radially opposite the partial peripheral surface b1). The sensor 16 is an electromagnetic pulse generator, for example. This means that when each of the detected portions 22, 23 passes in front of the sensor 16 (the detection position), the sensor 16 outputs the first signal S1 or the second signal S2. Therefore, the output result from the sensor 16 (specifically, a temporal change in the output) corresponds to the shape of the outer peripheral surface of the cylinder block body 21. Note that the sensor 16 may be a magneto-resistive element (MRE) rotation sensor or may be an optical rotation sensor.

Operation of Hydraulic Device

In the hydraulic device 2, the engine E drives the rotating shaft 24, and thus the cylinder block 11 rotates about the axis L1. Accordingly, the plurality of pistons 12 rotate about the axis L1 and reciprocate in the cylinder chambers 21*a*. Furthermore, when the cylinder block 11 rotates, the port to which the cylinder port 21*b* is connected switches between the inlet port 15*a* and the outlet port 15*b*. This allows the working fluid to be introduced into the cylinder chamber 21*a* through the inlet port 15*a*, and allows the working fluid to be discharged from the cylinder chamber 21*a* to the outlet port 15*b*. In this manner, the hydraulic device 2 discharges the working fluid.

Furthermore, in the hydraulic device 2, when a pilot pressure is input to the regulator 14, the swash plate 13 is tilted according to the pilot pressure. More specifically, the solenoid valve 25 adjusts the pilot pressure, thereby allowing adjustment of the tilt angle of the swash plate 13 via the regulator 14. Thus, the length of stroke of the piston 12 is adjusted. Therefore, it is possible to adjust the amount of the working fluid to be discharged in the hydraulic device 2.

Control Device

Figure 5:
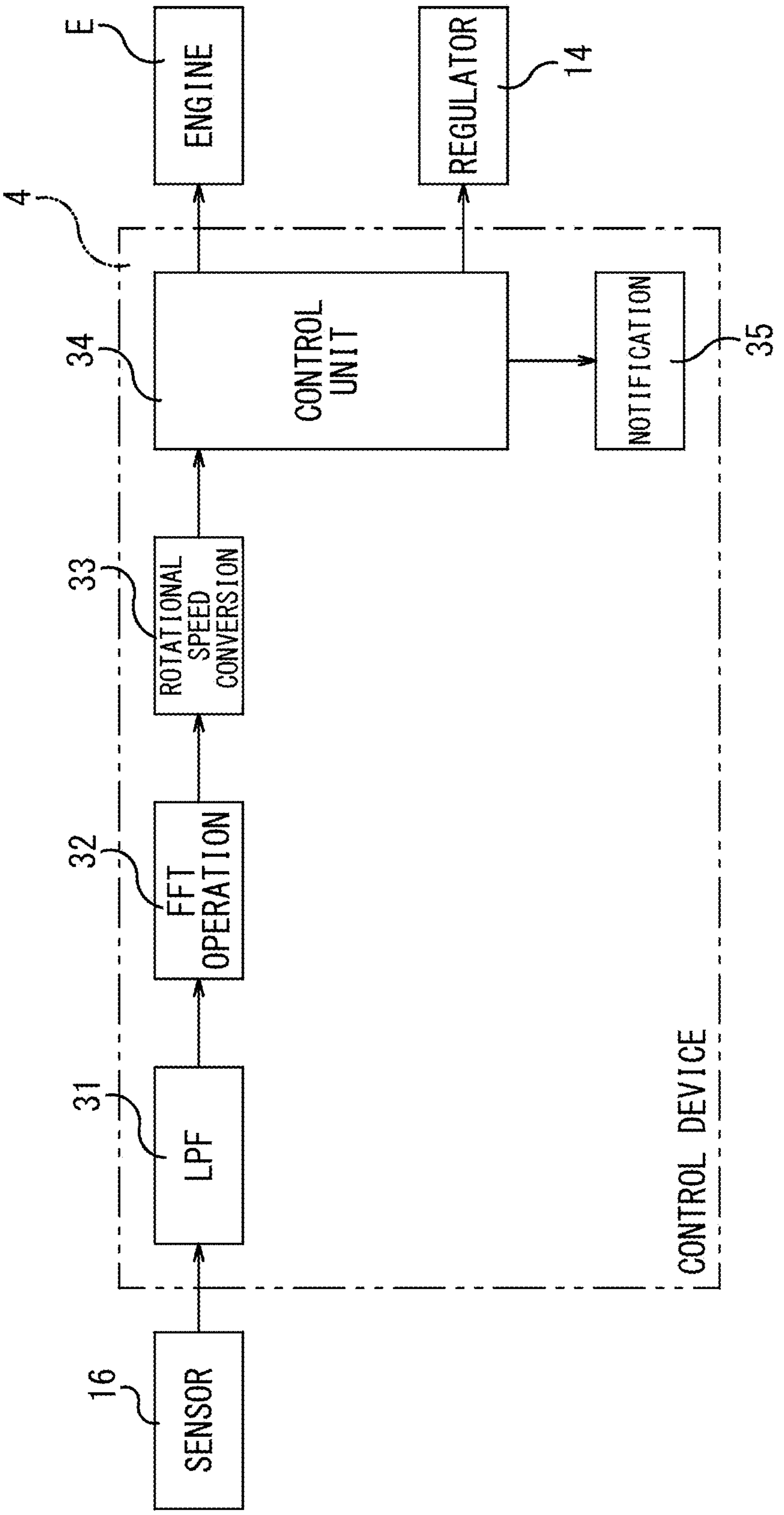
FIG. 5 is a block diagram associated with a control device included in the hydraulic system illustrated in FIG. 1.

The control device 3 controls the operation of the hydraulic device 2. More specifically, the control device 3 can control the movement of the regulator 14. This means that the control device 3 controls the operation of the solenoid valve 25. With this, the pilot pressure that is output from the solenoid valve 25 is adjusted, and thus the tilt angle of the swash plate 13 can be controlled. Furthermore, the control device 3, which is one example of the determination device, includes a LPF unit 31, a FFT operation processor 32, a rotational speed converter 33, a control unit 34, and a notification unit 35, as illustrated in FIG. 5. On the basis of the output result from the sensor 16, the control device 3 determines whether or not the cylinder block 11 is a suitable product. More specifically, by performing a FFT operation on the output result from the sensor 16, the control device 3 performs spectral analysis on the output result. Subsequently, on the basis of the result of the FFT operation, the control device 3 determines whether or not the cylinder block 11 is a suitable product. Moreover, the control device 3, which is one example of the limiting device, limits the output of the hydraulic device 2 on the basis of the determination result. In the present embodiment, the control device 3 limits the maximum output of the hydraulic device 2. Note that when the cylinder block 11 is an unsuitable product, the control device 3 may lower the overall output than that when the cylinder block 11 is a suitable product. According to the determination result, the control device 3, which is one example of the notification unit, provides a notification of whether or not the cylinder block 11 is a suitable product.

Figure 6:
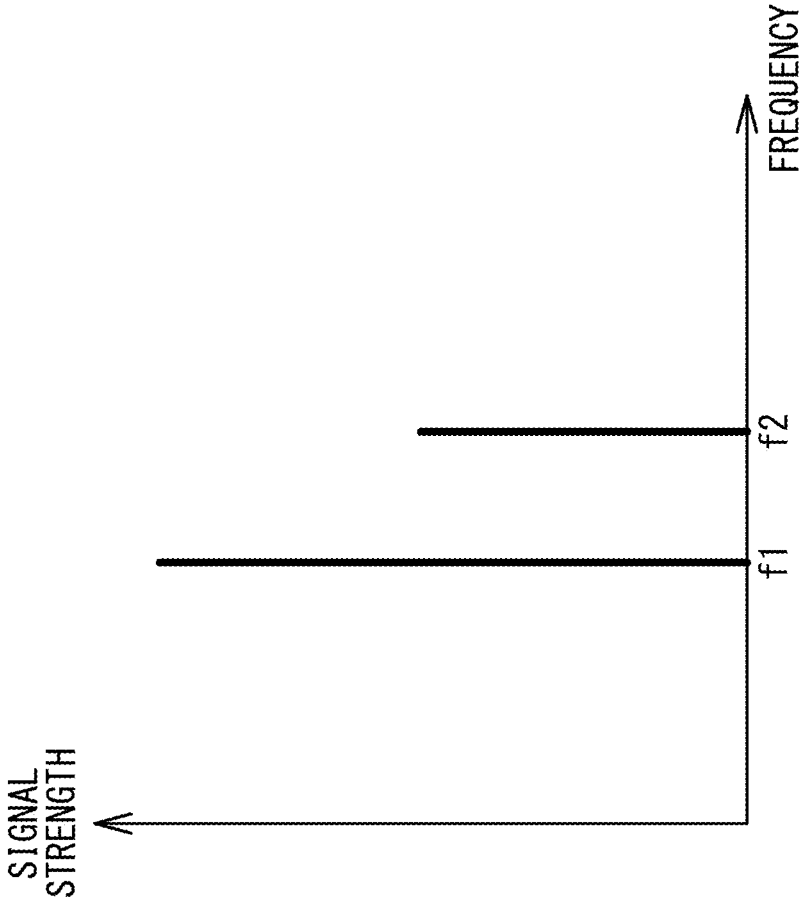
FIG. 6 is a graph showing an analysis result obtained by performing a fast Fourier transform (FFT) operation on the output result shown in FIG. 4.

The LPF unit 31 removes a high frequency component from the output result that is output from the sensor 16. This means that the LPF unit 31 is a low-pass filter. The FFT operation processor 32 performs the FFT operation on the output result filtered by the LPF unit 31. More specifically, the FFT operation processor 32 performs the spectral analysis on the output result to convert the sensor output that is output from the sensor 16 into frequency components (refer to FIG. 6).

The rotational speed converter 33 calculates the rotational speed of the cylinder block 11 per unit time. More specifically, the rotational speed converter 33 calculates a rotational speed on the basis of a reference component included in the analysis result from the FFT operation processor 32. In the present embodiment, the first detected portions 22 are formed at regular intervals in the hydraulic device 2. Therefore, the first signal S1 is output at a time interval t1 corresponding to the rotational speed of the cylinder block 11 (which is the rotational speed/the number of cylinder bores in the present embodiment). Since a larger number of first detected portions 22 than the number of second detected portions 23 are formed, more first signals S1 are output. As a result, in the analysis result, the spectrum of the frequency component attributed to the first signal S1, namely, a first frequency component f1 (a reference component), appears with the highest signal strength. Thus, the rotational speed converter 33 calculates a rotational speed on the basis of the first frequency component f1 which is a reference component.

Figure 4:
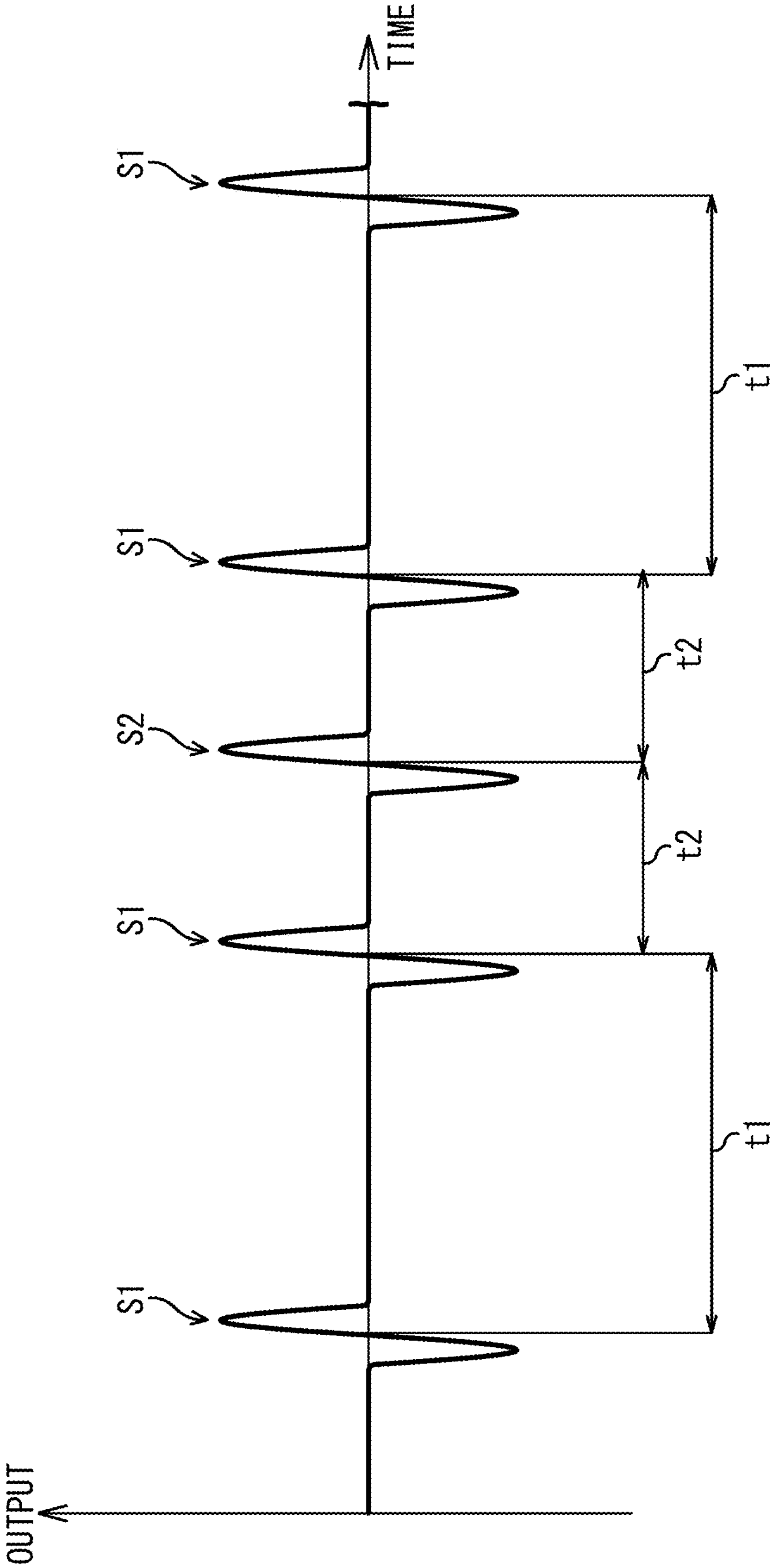
FIG. 4 is a graph showing an output result from a sensor included in the hydraulic system illustrated in FIG. 1.

Furthermore, the rotational speed converter 33 calculates an identification component according to the rotational speed. The identification component is a frequency component to be compared with the analysis result in determining whether or not the cylinder block 11 is a suitable product. More specifically, in the hydraulic device 2, when the cylinder block 11 rotates, the second signal S2 is output after a time interval t2 elapses since the last output of the first signal S1, as shown in FIG. 4. The second signal S2 is output at the time interval t2 ($<$t1) different from the time interval t1 of the first signal S1. Furthermore, the first signal S1 is also output at the time interval t2 after the second signal S2. Thus, in the analysis result, a second frequency component f2 different from the first frequency component f1 appears (refer to FIG. 6). The second frequency component f2 has a value corresponding to the second distance $\beta$ of the second detected portion 23 and the rotational speed. Therefore, when the identification component is set to a value that can be calculated using a coefficient corresponding to the second distance $\beta$ of the second detected portion 23 and the rotational speed, whether or not the second detected portions 23 have been formed at the second distance β can be determined by comparison between the identification component and the second frequency component f2. This means that by comparing the identification component and the second frequency component f2, it is possible to determine whether or not the cylinder block 11 is a suitable product. Therefore, the rotational speed converter 33 calculates the identification component on the basis of the calculated rotational speed and the second distance β.

On the basis of the analysis result from the FFT operation processor 32 and the identification component from the rotational speed converter 33, the control unit 34 determines whether or not the cylinder block 11 is a suitable product. More specifically, the control unit 34 sorts out, from the analysis result, a frequency with which the signal strength is high. In the present embodiment, in addition to the spectrum of the first frequency component f1, the spectrum of the second frequency component f2 is sorted out from the analysis result. Subsequently, the control unit 34 compares the second frequency component f2 and the identification component to determine whether or not the cylinder block 11 is a suitable product. Specifically, when the second frequency component f2 is the same as the identification component or is in a predetermined range (for example, in the range of tolerance or detection error) with respect to the identification component, the control unit 34 determines that the cylinder block 11 is a suitable product. On the other hand, when the second frequency component f2 is not in the predetermined range with respect to the identification component, the control unit 34 determines that the cylinder block 11 is an unsuitable product.

When the control unit 34 determines that the cylinder block 11 is an unsuitable product, the control unit 34 limits the output of the hydraulic device 2. In the present embodiment, the control unit 34 limits the maximum output of the hydraulic device 2. More specifically, the control unit 34 controls the operation of the solenoid valve 25 to limit the maximum tilt angle of the swash plate 13 to less than a predetermined angle. Accordingly, the maximum discharge amount of the hydraulic device 2 is reduced, and thus the maximum output of the hydraulic device 2 decreases. Furthermore, the control unit 34 controls the operation of the engine E. The control unit 34 may limit the output of the hydraulic device 2 by reducing the output of the engine E. Moreover, the control unit 34 may delay the response of tilting of the swash plate 13 like a ramp.

According to the determination result, the notification unit 35 provides a notification of whether or not the cylinder block 11 is a suitable product. More specifically, the notification unit 35 outputs sound, displays an indication, or emits light, for example, to notify a user, etc., of whether or not the cylinder block 11 is a suitable product. Furthermore, the notification unit 35 transmits, to a predetermined data center or the like, information of whether or not the cylinder block 11 is a suitable product.

Determination in Hydraulic System

In the hydraulic system 1, when the cylinder block 11 rotates, the sensor 16 outputs the first signal S1 and the second signal S2, the number of which corresponds to the number of detected portions 22, 23. In the control device 3, the LPF unit 31 removes a high frequency component from the output result from the sensor 16. The FFT operation processor 32 performs the spectral analysis on the output result filtered by the LPF unit 31. The rotational speed converter 33 calculates the rotational speed and the identification component on the basis of the analysis result. Subsequently, the control unit 34 compares the calculated identification component and the second frequency component f2 to determine whether or not the cylinder block 11 is a suitable product.

When the control unit 34 determines that the cylinder block 11 is a suitable product, the control unit 34 permits the maximum output. Specifically, the control unit 34 allows the maximum tilt angle of the swash plate 13 in the hydraulic device 2 to increase up to a predetermined angle. Note that the allowable tilt angle (that is, the predetermined angle) may be set according to the pressure. On the other hand, when the control unit 34 determines that the cylinder block 11 is an unsuitable product, the control unit 34 limits the maximum output. For example, the control unit 34 limits the output of the hydraulic device 2 by controlling the regulator 14. More specifically, the control unit 34 controls the regulator 14 to limit the maximum tilt angle of the swash plate 13 in the hydraulic device 2 to less than a predetermined angle. Thus, the maximum output of the hydraulic device 2 is limited when the cylinder block 11 is an unsuitable product.

Furthermore, using the notification unit 35, the control unit 34 transmits, to a predetermined data center or the like, information of whether or not the cylinder block 11 is a suitable product. The notification unit 35 outputs sound, displays an indication, or emits light, for example, to notify a user, etc., of whether or not the cylinder block 11 is a suitable product.

With the he hydraulic system 1 according to the present embodiment, each of the first detected portion 22 and the second detected portion 23 is detected during the rotation of the cylinder block 11. Accordingly, the first signal S1 that is output at the time interval t1 corresponding to the first distance α and the second signal S2 that is output at the time interval t2 corresponding to the second distance β appear (refer to FIG. 4). Using the first signal S1 and the second signal S2 that are output at different time intervals, the control device 3 can determine whether or not the cylinder block 11 is a suitable product.

In the present embodiment, the first signal S1 is output from the sensor 16 at regular time intervals t1 on the basis of the first detected portion 22. Therefore, the first signal S1 is used as a reference signal. On the other hand, after the last first signal S1 is output, the second signal S2 is output from the sensor 16 at the time interval t2 on the basis of the second detected portion 23. The second signal S2 is output at the time interval t2 which is different from the time interval of the first signal S1 and corresponds to the second distance β. Thus, the second signal S2 is used as a signal for identification. Using the first signal S1 and the second signal S2, the time interval t2 at which the second signal S2 is output (that is the second frequency component f2 in the present embodiment) is compared to a predetermined time interval (that is the identification component in the present embodiment). Thus, the control device 3 can determine whether or not the cylinder block 11 is a suitable product.

Furthermore, with the hydraulic system 1, it is possible to perform the spectral analysis on the output result from the sensor 16 by performing the FFT operation. As a result, using the spectrum of each frequency that is included in the analysis result, the time interval t2 at which the second signal S2 is output, that is, the second distance β, can be easily determined to be different. Thus, it is possible to easily and accurately determine whether or not the cylinder block 11 is a suitable product.

Furthermore, with the hydraulic system 1, the output of the hydraulic device 2 is limited on the basis of the determination result, and thus it is possible to reduce the occurrence of problems with the hydraulic device 2 in which the cylinder block 11 that is an unsuitable product is used. Moreover, with the hydraulic system 1, since the hydraulic device 2 is a swash plate hydraulic device of the variable capacity type, the output of the hydraulic device 2 can be easily limited.

More specifically, in the hydraulic device 2, when the cylinder block 11 that is a suitable block is used, it can be ensured that the discharge flow rate and the tilt angle in the hydraulic device 2 are highly responsive to an electric current. Therefore, the discharge flow rate in the hydraulic device 2 can be controlled in a more accurate and advanced manner even in consideration of horsepower control. As a result, the hydraulic device 2 can be controlled so as to exhibit high operating performance and have great fuel efficiency. On the other hand, when the cylinder block that is an unsuitable product is used in the hydraulic device 2, performance cannot be ensured in terms of the responsiveness of the discharge flow rate and the tilt angle. Therefore, if the same control is performed as in the case where the cylinder block 11 that is a suitable product is used, at least one of the fuel efficiency and the operating performance is lowered. In particular, a significant drop in the responsiveness of the tilt angle is observed. For example, when the hydraulic system 1 is applied to an excavator, a drop in the responsiveness of the tilt angle has an impact on the likelihood of hunting in response to driver operation. Therefore, in order to prevent such problems, in the case where the cylinder block that is an unsuitable product is used in the hydraulic device 2, the control device 3 performs the following control. Specifically, the control device 3 reduces the maximum output of the hydraulic device 2 or reduces the responsiveness of the tilt angle. This prevents a significant drop in at least one of the operating performance and the fuel efficiency of the hydraulic device 2 even when the cylinder block that is an unsuitable product is used in the hydraulic device 2.

Furthermore, with the hydraulic system 1, the control device 3 can notify a user, a manager, etc., of whether or not the cylinder block 11 is a suitable product. Thus, it is possible to notify a driver that there is no choice but to perform appropriate control for the hydraulic device 2 in which the cylinder block 11 that is an unsuitable product is used, instead of the optimal control to be performed when a suitable product is used.

Furthermore, in the hydraulic system 1, since each of the first detected portion 22 and the second detected portion 23 is a recess, the first detected portion 22 and the second detected portion 23 can be easily formed with accuracy. This makes it possible to accurately determine whether or not the cylinder block 11 is a suitable product.

Furthermore, in the hydraulic system 1, similar to the first detected portions 22, the second detected portions 23 are also formed regularly (specifically, at a distance $\gamma$ from each other), and thus it is possible to form the cylinder block body 21 with a more evenly balanced weight.

In the hydraulic system 1, the first detected portion 22 and the second detected portion 23 are arranged on the partial peripheral surface b1. Therefore, it is possible to share the sensor 16 for detecting the first detected portion 22 and the second detected portion 23, meaning that the number of components can be reduced.

In the hydraulic system 1, since a pulse generator is used as the sensor 16, the first detected portion 22 and the second detected portion 23 to be detected are less likely to have complex configurations.

Embodiment 2

Figure 7:
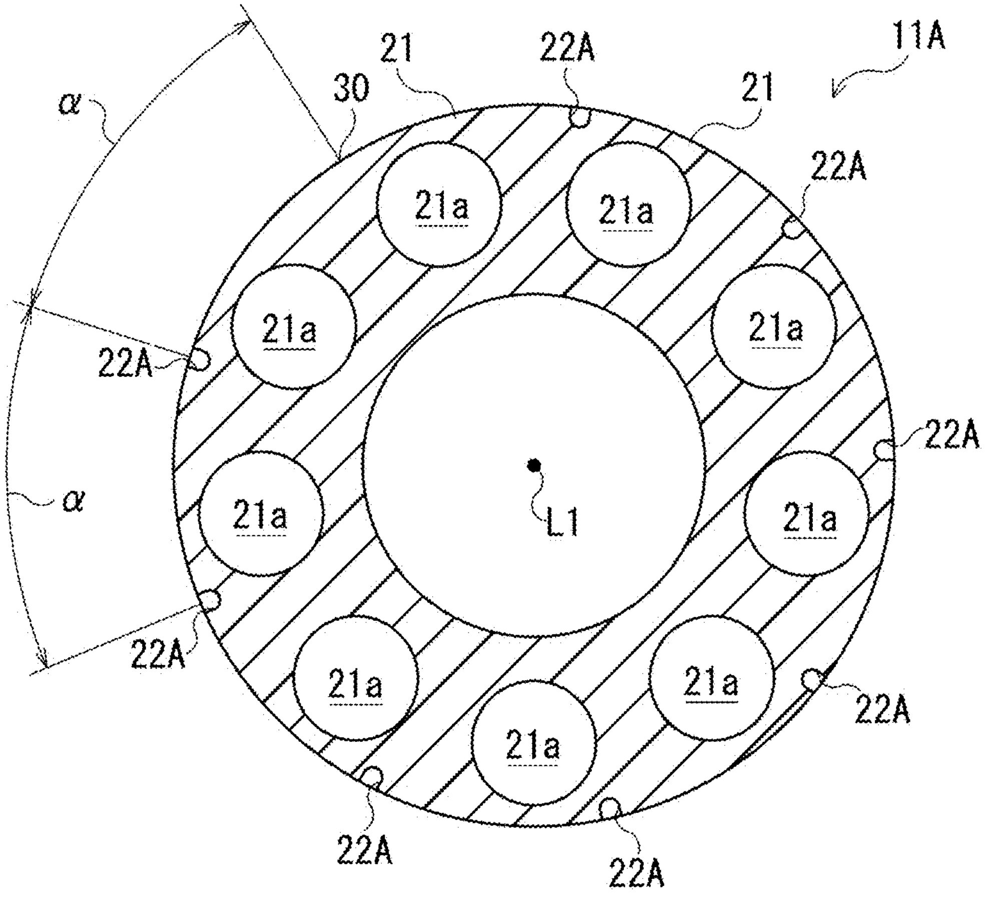
FIG. 7 is a cross-sectional view illustrating a cylinder block included in a hydraulic system according to Embodiment 2 of the present invention.

A hydraulic system 1A according to Embodiment 2 has a configuration similar to the configuration of the hydraulic system 1 according to Embodiment 1 (refer to FIG. 1). More specifically, the hydraulic system 1A according to Embodiment 2 is different from the hydraulic system 1 according to Embodiment 1 in that the hydraulic device 2 includes a cylinder block 11A illustrated in FIG. 7. Therefore, the following description will focus on the cylinder block 11A. The other elements of the hydraulic system 1A according to Embodiment 2 that are the same as those of the hydraulic system 1 according to Embodiment 1 share the same reference signs, and as such, description of the elements will be omitted. The same applies to the cylinder block 11A.

The cylinder block 11A according to Embodiment 2 includes the cylinder block body 21 and a plurality of first detected portions 22A. The plurality of first detected portions 22A are formed on the outer peripheral surface of the cylinder block body 21. More specifically, N−1 first detected portions 22A are formed on the cylinder block body 21. In the present embodiment, N is nine. Specifically, eight first detected portions 22A are formed on the cylinder block body 21. The first detected portions 22A are disposed at N−1 positions that are other than one remaining position 30 among positions determined by equally dividing the outer peripheral surface of the cylinder block body 21 by N. In the present embodiment, the first detected portions 22A are disposed at eight positions that are the first to eighth positions among positions determined by equally dividing the outer peripheral surface of the cylinder block body 21 by nine. The first detected portion 22A and the other detected portions are not formed at the ninth position which is the remaining position 30. The first detected portion 22A is detected by the sensor 16. The sensor 16 outputs the first signal S1 according to the first detected portion 22A.

In the hydraulic system 1A according to Embodiment 2 configured as just described, the first detected portions 22A are disposed at regular intervals, at the first to eighth positions among the positions determined by equally dividing the outer peripheral surface of the cylinder block body 21 by nine. Therefore, during the rotation of the cylinder block 11A, at the first to eighth positions, the first signal S1 is output from the sensor 16 at the time interval t1 corresponding to the rotational speed of the cylinder block 11A.

Figure 8:
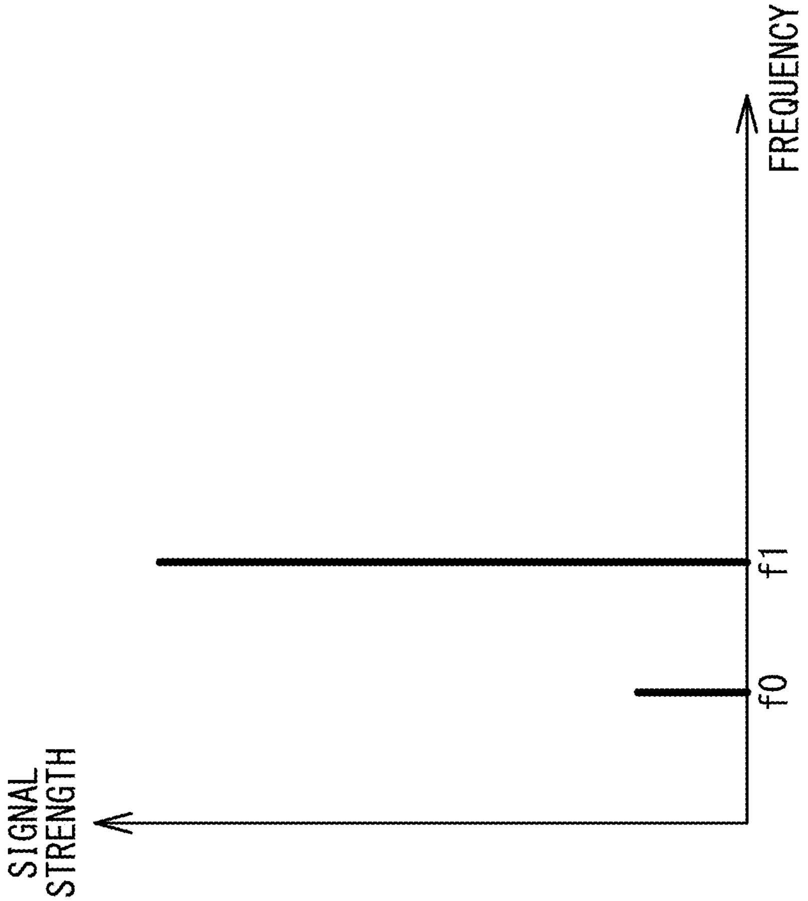
FIG. 8 is a graph showing an analysis result obtained by performing a FFT operation on an output result from a hydraulic system in which the cylinder block illustrated in FIG. 7 is used.

Meanwhile, the first detected portion 22A is absent at the ninth position which is the remaining position 30. Therefore, the first signal S1 is not output during the period between when the eighth position passes by the sensor 16 and when the following first position passes by the sensor 16, for example. In other words, the first signal S1 is output from the sensor 16 at a time interval t0 (=t1×2) different from the time interval t1 during this period. As a result, in the analysis result, a frequency component f0 (=(f1)/2) different from the first frequency component f1 attributed to the time interval t1 appears as illustrated in FIG. 8. The control unit 34 compares the identification component calculated in advance and the frequency component f0 to determine whether or not the cylinder block 11A is a suitable product.

In the hydraulic system 1A according to Embodiment 2 configured as just described, the first detected portion 22A is absent at the remaining position 30, and thus detecting the first detected portion 22A during the rotation of the cylinder block 11A results in the following. Specifically, the time interval to at which the first signal S1 is output according to the first detected portions 22A located adjacent to each other across the remaining position 30 in the direction of rotation is different from the time interval t1 at which the first signal S1 is output when the other first detected portions 22A are detected. By varying the time interval at which the first signal S1 is output in this manner, the control device 3 can determine whether or not the cylinder block 11A is a suitable product.

The hydraulic system 1A according to Embodiment 2 produces advantageous effects that are substantially the same as those produced by the hydraulic system 1 according to Embodiment 1.

Embodiment 3

Figure 9:
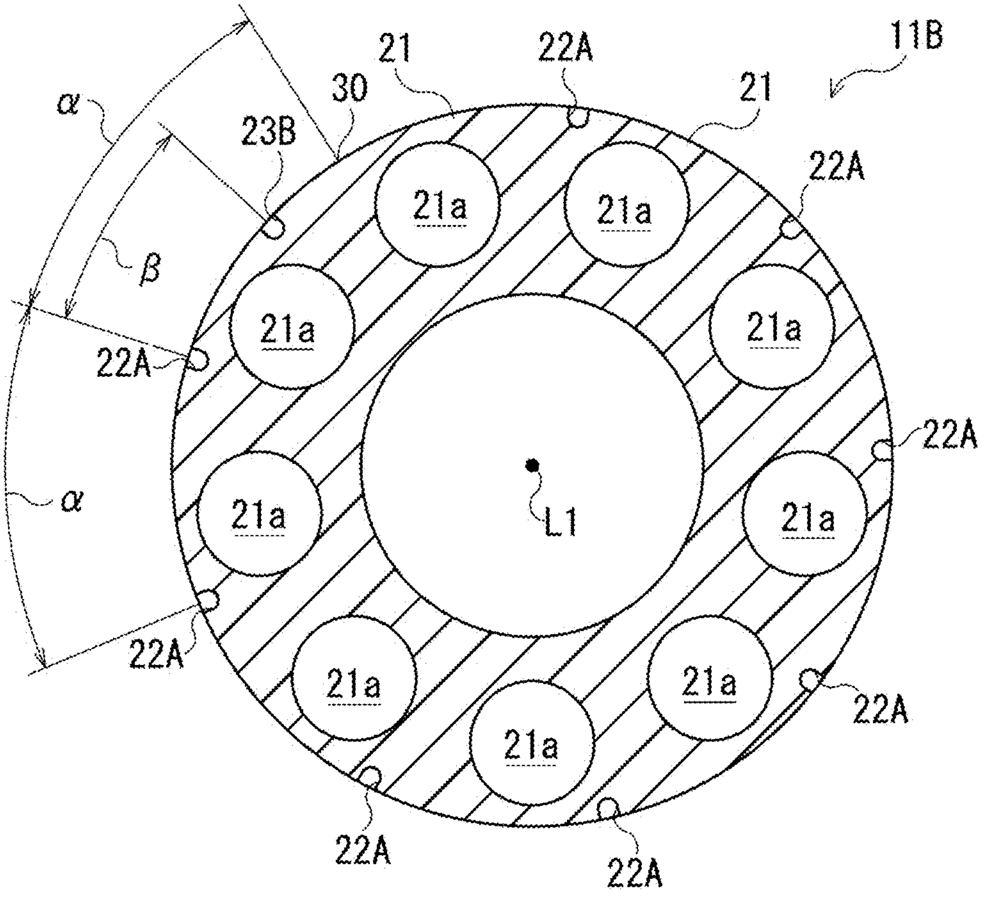
FIG. 9 is a cross-sectional view illustrating a cylinder block included in a hydraulic system according to Embodiment 3 of the present invention.

A hydraulic system 1B according to Embodiment 3 has a configuration similar to the configuration of the hydraulic system 1A according to Embodiment 2 (refer to FIG. 1). More specifically, the hydraulic system 1B according to Embodiment 3 is different from the hydraulic system 1A according to Embodiment 2 in that the hydraulic device 2 includes a cylinder block 11B illustrated in FIG. 9. Therefore, the following description will focus on the cylinder block 11B. The other elements of the hydraulic system 1B according to Embodiment 3 that are the same as those of the hydraulic system 1A according to Embodiment 2 (in other words, that are the same as those of the hydraulic system 1 according to Embodiment 1) share the same reference signs, and as such, description of the elements will be omitted. The same applies to the cylinder block 11B.

The cylinder block 11B according to Embodiment 3 includes the cylinder block body 21, the plurality of first detected portions 22A, and a second detected portion 23B. The second detected portion 23B is formed on the outer peripheral surface of the cylinder block body 21. The second detected portion 23B is disposed at a position offset from the remaining position 30 that is the N-th position (that is the ninth position in the present embodiment). More specifically, the second detected portion 23B is disposed at a position offset from the remaining position 30, in the area between the first position and the eighth position. In other words, the eight first detected portions 22A are arranged at the first distance $\alpha$ (=40 degrees) on the outer peripheral surface of the cylinder block body 21. The second detected portion 23B is disposed at the second distance $\beta$ from the first detected portion 22A disposed at the eighth position. The second detected portion 23B is detected by the sensor 16. The sensor 16 outputs the second signal S2 according to the second detected portion 23B.

Figure 10:
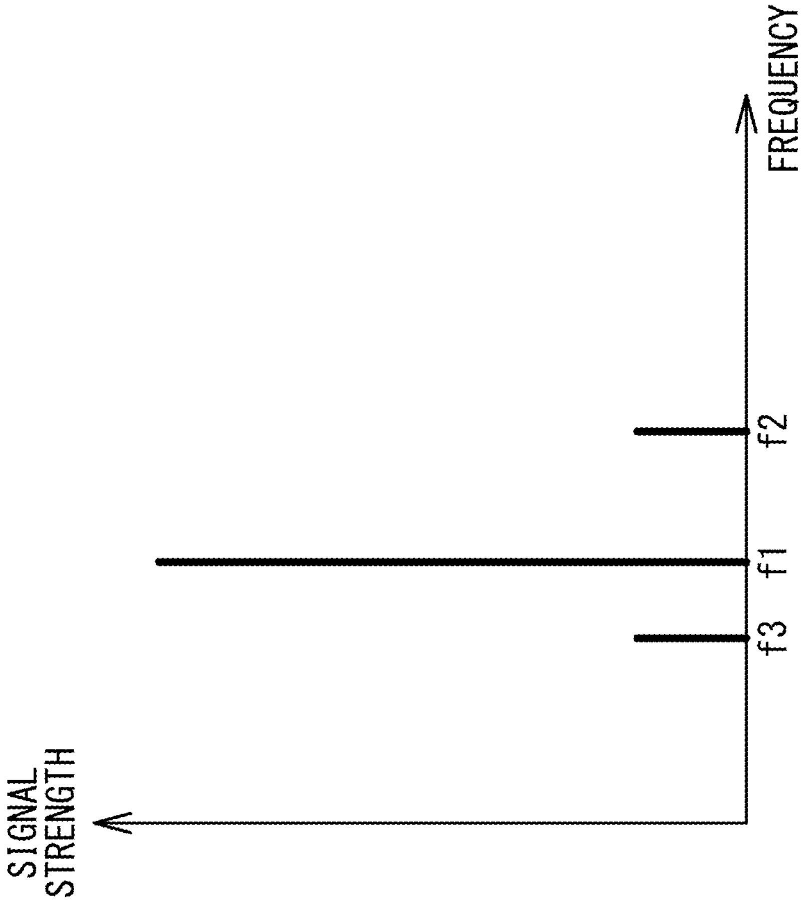
FIG. 10 is a graph showing an analysis result obtained by performing a FFT operation on an output result from a hydraulic system in which the cylinder block illustrated in FIG. 9 is used.

In the cylinder block 11B according to Embodiment 3 configured as just described, the second detected portion 23B is disposed at a position offset from the remaining position 30, in the area between the first position and the eighth position. Therefore, when the cylinder block 11B rotates, the time interval t2 at which the second signal S2 is output becomes different from the time interval t1. As a result, in the analysis result, the second frequency component f2 different from the first frequency component f1 attributed to the time interval t1 appears as illustrated in FIG. 10. Furthermore, since the second detected portion 23B is disposed at a position offset from the N-th position, a time interval t3 at which the first signal S1 is output after the second signal S2 is output is different from both the time intervals t1, t2. Thus, in the analysis result, a third frequency component f3 also appears. Using these three frequency components f1, f2, f3, the control unit 34 determines whether or not the cylinder block 11B is a suitable product.

In the hydraulic system 1B according to Embodiment 3 configured as just described, when the first detected portion 22A and the second detected portion 23B are detected during the rotation of the cylinder block 11B, the first signal S1 and the second signal S2 are output at different time intervals t1, t2, t3. Therefore, using the first signal S1 and the second signal S2, it is possible to determine whether or not the cylinder block 11B is a suitable product.

The hydraulic system 1B according to Embodiment 3 produces advantageous effects that are substantially the same as those produced by the hydraulic system 1A according to Embodiment 2.

Embodiment 4

Figure 11:
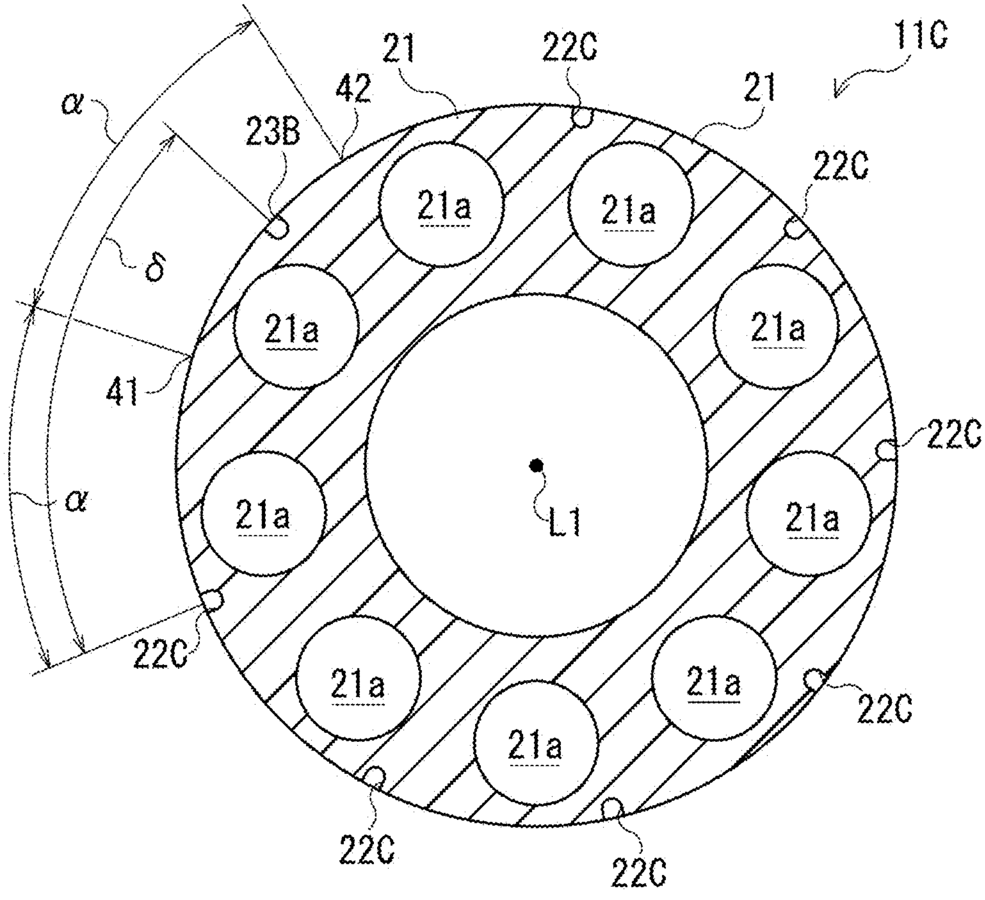
FIG. 11 is a cross-sectional view illustrating a cylinder block included in a hydraulic system according to Embodiment 4 of the present invention.

A hydraulic system 1C according to Embodiment 4 has a configuration similar to the configuration of the hydraulic system 1B according to Embodiment 3 (refer to FIG. 1). More specifically, the hydraulic system 1C according to Embodiment 4 is different from the hydraulic system 1B according to Embodiment 3 in that the hydraulic device 2 includes a cylinder block 11C illustrated in FIG. 11. Therefore, the following description will focus on the cylinder block 11C. The other elements of the hydraulic system 1C according to Embodiment 4 that are the same as those of the hydraulic system 1B according to Embodiment 3 (in other words, that are the same as those of the hydraulic system 1 according to Embodiment 1) share the same reference signs, and as such, description of the elements will be omitted. The same applies to the cylinder block 11C.

The cylinder block 11C according to Embodiment 4 includes the cylinder block body 21, a plurality of first detected portions 22C, and the second detected portion 23B. N−2 first detected portions 22C are formed in the cylinder block body 21. The first detected portions 22C are arranged at N−2 positions among positions determined by equally dividing the outer peripheral surface of the cylinder block body 21 by N. In the present embodiment, N is nine. The first detected portions 22C are disposed at seven positions that are the first to seventh positions among the positions determined by equally dividing the outer peripheral surface of the cylinder block body 21 by nine. Specifically, the first detected portion 22C and the other detected portions are not formed at the eighth and ninth positions which are remaining positions 41, 42.

The second detected portion 23B is formed on the outer peripheral surface of the cylinder block body 21. The second detected portion 23B is disposed at a position offset from the remaining positions 41, 42 that are the N-th and N−1-th positions (that are the eighth and ninth positions in the present embodiment). More specifically, the second detected portion 23B is disposed at a position offset from the two remaining positions 41, 42 in the area between the first position and the seventh position. In other words, the seven first detected portions 22C are arranged at the first distance $\alpha$ (=40 degrees) on the outer peripheral surface of the cylinder block body 21. The second detected portion 23B is disposed at a third distance $\delta$ ($\neq\alpha$) from the first detected portion 22C disposed at the seventh position.

In the cylinder block 11C according to Embodiment 4 configured as just described, similar to the cylinder block 11B according to Embodiment 3, a time interval t4 at which the second signal S2 is output during the rotation of the cylinder block 11C is different from the time interval t1. Furthermore, since the second detected portion 23B is disposed at a position offset from the N-th position, the first signal S1 is output at a time interval S5 after the second signal S2 is output. Therefore, three different frequency components f1, f4, f5 are obtained in the analysis result;

thus, using the three frequency components f1, f4, f5, the control unit 34 can determine whether or not the cylinder block 11C is a suitable product.

In the hydraulic system 1C according to Embodiment 4 configured as just described, when the first detected portion 22C and the second detected portion 23B are detected during the rotation of the cylinder block 11C, the first signal S1 and the second signal S2 are output at different time intervals t1, t4, t5. Using the first signal S1 and the second signal S2, it is possible to determine whether or not the cylinder block 11C is a suitable product.

The hydraulic system 1C according to Embodiment 4 produces advantageous effects that are substantially the same as those produced by the hydraulic system 1B according to Embodiment 3.

Other Embodiments

In the hydraulic systems 1, 1A to 1C according to the present embodiment, the detected portions 22, 22A, 22C, 23, 23B are arranged at two different intervals on the outer peripheral surface of the cylinder block body 21. The detected portions 22, 22A, 22C, 23, 23B may be arranged at three or more different intervals (for example, these are arranged at three intervals with respect to a target detected portion). In this case, three or more frequency components appear with a high signal strength in the analysis result, and when all these frequency components are the same as the identification component or in the predetermined range with respect to the identification component, the cylinder block 11 is determined as a suitable product. The first distance α does not necessarily need to be a distance determined by equally dividing the outer peripheral surface of the cylinder block body 21. Specifically, in the case where there are nine first detected portions 22, the first distance α does not necessarily need to be 40 degrees and may be less than 40 degrees or may exceed 40 degrees. Furthermore, while the detected portions 22, 23 are recessed grooves, these may be protrusions (for example, protruding strips).

While the second detected portion 23 is disposed at the second distance β from both of two adjacent first detected portions 22 in the hydraulic system 1 according to Embodiment 1, the second detected portion 23 does not necessarily need to be disposed in this manner. For example, the second detected portion 23 may be disposed at a distance different from the first distance α and the second distance β with respect to the other of the two adjacent first detected portions 22 (the first detected portion 22 located on the other side in the circumferential direction). In this case, a frequency component different from the first frequency component f1 and the second frequency component f2 appears in the analysis result. Subsequently, using these three frequency components, the control unit 34 determines whether or not the cylinder block 11 is a suitable product.

Furthermore, while the detected portions 22, 22A, 22C, 23, 23B are recessed grooves in the hydraulic systems 1, 1A to 1C according to the present embodiment, these may be anything to which the sensor 16 reacts. The detected portions 22, 22A, 22C, 23, 23B may be metal plates or reflectors, for example; it is sufficient that these reflect electromagnetic waves, light, or the like emitted by the sensor 16. Moreover, the detected portions 22, 22A, 22C, 23, 23B do not necessarily need to be arranged on the partial peripheral surface b1. For example, the sensor 16 may be provided for each of the detected portions 22, 22A, 22C, 23, 23B, and the output results from the sensors 16 may be combined.

Furthermore, while the foregoing has described a hydraulic pump device as an example of the hydraulic device 2 according to the present embodiment, the hydraulic device 2 according to the present embodiment may be a hydraulic motor device as mentioned above. The case where the hydraulic device 2 is a hydraulic motor device is basically the same as in the case where the hydraulic device 2 is a hydraulic pump device; however, if the cylinder blocks 11, 11A to 11C are unsuitable products, the control device 3 controls the tilt angle of the swash plate 13 to limit the torque of the rotating shaft 24 as the output of the hydraulic device 2. For example, the control device 3 may increase the tilt angle of the swash plate 13 to reduce the rotational speed.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

The invention claimed is:

1. A hydraulic system comprising:

a hydraulic device including a casing, a cylinder block including a plurality of first detected portions and one or more second detected portions on an outer peripheral surface of a cylinder block body rotatably supported on the casing and in which a plurality of cylinder chambers are formed around a rotating shaft, a piston that is housed in each of the plurality of cylinder chambers of the cylinder block in a manner that allows reciprocation of the piston, a linkage mechanism that reciprocates the piston in conjunction with rotation of the cylinder block, and a sensor that is provided at a position corresponding to each of the plurality of first detected portions and the one or more second detected portions and when each of the plurality of first detected portions and the one or more second detected portions passes by during the rotation of the cylinder block, outputs a corresponding one of a first signal and a second signal; and a hardware controller, including a processor, that determines, on the basis of an output result that is output from the sensor, whether or not the cylinder block is a suitable product, wherein the plurality of first detected portions are circumferentially spaced apart from each other at a first distance on the outer peripheral surface of the cylinder block body, the first distance being predetermined, the one or more second detected portions are each circumferentially spaced apart from an adjacent one of the plurality of first detected portions at a second distance different from the first distance on the outer peripheral surface of the cylinder block body, and the hardware controller determines whether or not the cylinder block is a suitable product, using, as a reference signal, the first signal that is output at a time interval corresponding to the first distance, and using, as a signal for identification, the second signal that is output at a time interval corresponding to the second distance.

2. The hydraulic system according to claim 1, wherein the hardware controller performs a fast Fourier transform (FFT) operation on the output result from the sensor and determines, on the basis of a result of the FFT operation, whether or not the cylinder block is a suitable product.

3. The hydraulic system according to claim 1, wherein the hardware controller limits an output of the hydraulic device or reduces responsiveness of the hydraulic device on the basis of a determination result.

4. The hydraulic system according to claim 3, wherein the hydraulic device further includes a regulator that changes a tilt angle of a swash plate which is the linkage mechanism, and the hardware controller controls the regulator to limit the output of the hydraulic device or reduce the responsiveness of the hydraulic device.

5. The hydraulic system according to claim 1, wherein the hardware controller provides, according to a determination result, a notification of whether or not the cylinder block is a suitable product.

6. A hydraulic system comprising:

a hydraulic device including a casing, a cylinder block including a cylinder block body rotatably supported on the casing and in which a plurality of cylinder chambers are formed around a rotating shaft and N−1 first detected portions formed on an outer peripheral surface of the cylinder block body, a piston that is housed in each of the plurality of cylinder chambers of the cylinder block in a manner that allows reciprocation of the piston, a linkage mechanism that reciprocates the piston in conjunction with rotation of the cylinder block, and a sensor that is provided at a position corresponding to each of the plurality of first detected portions and when each of the plurality of first detected portions passes by during the rotation of the cylinder block, outputs a first signal; and a hardware controller, including a processor, that determines, on the basis of an output result that is output from the sensor, whether or not the cylinder block is a suitable product, wherein the plurality of first detected portions are disposed at N−1 positions that are among positions determined by equally dividing the outer peripheral surface of the cylinder block body by N, and the hardware controller determines whether or not the cylinder block is a suitable product, on the basis of a first frequency component attributed to the first signal and a frequency component different from the first frequency component and attributed to an absence of the plurality of first detected portions at remaining positions.

7. A hydraulic system comprising:

a hydraulic device including a casing, a cylinder block including a cylinder block body rotatably supported on the casing and in which a plurality of cylinder chambers are formed around a rotating shaft and N−1 first detected portions formed on an outer peripheral surface of the cylinder block body, a piston that is housed in each of the plurality of cylinder chambers of the cylinder block in a manner that allows reciprocation of the piston, a linkage mechanism that reciprocates the piston in conjunction with rotation of the cylinder block, and a sensor that is provided at a position corresponding to each of the plurality of first detected portions and when each of the plurality of first detected portions passes by during the rotation of the cylinder block, outputs a first signal; and a hardware controller, including a processor, that determines, on the basis of an output result that is output from the sensor, whether or not the cylinder block is a suitable product, wherein the plurality of first detected portions are disposed at N−1 positions that are among positions determined by equally dividing the outer peripheral surface of the cylinder block body by N, the cylinder block further includes a second detected portion formed on the outer peripheral surface of the cylinder block body, the second detected portion is disposed at a position offset from a remaining position, and the hardware controller determines whether or not the cylinder block is a suitable product, using, as a reference signal, the first signal that is output at a time interval corresponding to a first distance, and using, as a signal for identification, a second signal that is output at a time interval corresponding to a second distance.

8. A hydraulic system comprising:

a hydraulic device including a casing, a cylinder block including a cylinder block body rotatably supported on the casing and in which a plurality of cylinder chambers are formed around a rotating shaft, N−2 first detected portions formed on an outer peripheral surface of the cylinder block body, and a second detected portion formed on the outer peripheral surface of the cylinder block body, a piston that is housed in each of the plurality of cylinder chambers of the cylinder block in a manner that allows reciprocation of the piston, a linkage mechanism that reciprocates the piston in conjunction with rotation of the cylinder block, and a sensor that is provided at a position corresponding to each of the N−2 first detected portions and the second detected portion and when each of the N−2 first detected portions and the second detected portion passes by during the rotation of the cylinder block, outputs a corresponding one of a first signal and a second signal; and a hardware controller, including a processor, that determines, on the basis of an output result that is output from the sensor, whether or not the cylinder block is a suitable product, wherein the N−2 first detected portions are disposed at N−2 positions that are among positions determined by equally dividing the outer peripheral surface of the cylinder block body by N, the second detected portion is one second detected portion disposed at a position offset from two remaining positions among the positions determined by equally dividing the outer peripheral surface of the cylinder block body by N, and the hardware controller determines whether or not the cylinder block is a suitable product, using, as a reference signal, the first signal that is output at a time interval corresponding to a first distance, and using, as a signal for identification, the second signal that is output at a time interval corresponding to a second distance.

* * * * *